(12) United States Patent
Naito

(10) Patent No.: US 10,914,613 B2
(45) Date of Patent: Feb. 9, 2021

(54) ROTATION ANGLE DETECTION DEVICE AND ELECTRONIC APPARATUS USING THIS COMPRISING PLURAL ROTATION DETECTION ELEMENTS RESPECTIVELY DETECTING RADIALLY OUTER SCALE AND RADIALLY INNER SCALE OF A ROTATION DETECTION TARGET

(71) Applicant: CANON KABUSHIKI KAISHA, Tokyo (JP)

(72) Inventor: Go Naito, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 142 days.

(21) Appl. No.: 16/131,626

(22) Filed: Sep. 14, 2018

(65) Prior Publication Data

US 2019/0086242 A1    Mar. 21, 2019

(30) Foreign Application Priority Data

Sep. 20, 2017   (JP) ................. 2017-180188

(51) Int. Cl.
  *G01D 5/347*   (2006.01)
  *G01D 5/30*   (2006.01)
  *G03B 17/02*   (2021.01)
  *G01D 5/244*   (2006.01)
  *H04N 5/232*   (2006.01)
  *G03B 17/14*   (2021.01)

(52) U.S. Cl.
  CPC ........... *G01D 5/30* (2013.01); *G01D 5/24476* (2013.01); *G01D 5/34776* (2013.01); *G03B 17/02* (2013.01); *G03B 17/14* (2013.01); *H04N 5/23245* (2013.01)

(58) Field of Classification Search
  CPC ...... G03F 7/70775; G03F 9/00; B25J 19/021; B25J 9/126; G01D 5/34707; G01D 5/3473; G01D 5/34776; G01D 5/30; G01D 5/24476; G01D 5/34784; G03B 17/14; G03B 17/02; G11B 5/56; G11B 5/59627; H04N 5/23245
  USPC ................................. 250/231.13, 221, 214 R
  See application file for complete search history.

(56) References Cited

U.S. PATENT DOCUMENTS 5,539,583 A * 7/1996 Watanabe ............ G01D 5/3473
                                                    250/231.14

FOREIGN PATENT DOCUMENTS

JP       H0545179 A      2/1993
JP       2013083597 A    5/2013

* cited by examiner

*Primary Examiner* — Que Tan Le
(74) *Attorney, Agent, or Firm* — Rossi, Kimms & McDowell LLP

(57) ABSTRACT

A rotation angle detection device that is capable of detecting an absolute rotation position with a high accuracy without an error. A rotation detection target rotates together an operatable rotation member and has an outer scale and an inner scale. Two rotation detection elements are arranged at opposite positions across the rotation axis in the radial direction so as to respectively irradiate the outer and the inner scales with light beams and output signals corresponding to reflected components. A control unit calculates a rotation angle of the rotation detection target using the signals. The outer and inner scales are so formed that a signal output from one of the two rotation detection elements increases and the signal output from the other decreases when the rotation member is rotated.

8 Claims, 8 Drawing Sheets ated ROTATION ANGLE DETECTION DEVICE AND ELECTRONIC APPARATUS USING THIS COMPRISING PLURAL ROTATION DETECTION ELEMENTS RESPECTIVELY DETECTING RADIALLY OUTER SCALE AND RADIALLY INNER SCALE OF A ROTATION DETECTION TARGET

BACKGROUND OF THE INVENTION

Field of the Invention

The present invention relates to a rotation angle detection device that detects a rotational position of a rotation member by detecting an edge included in a scale using an optical sensor, and relates to an electronic apparatus using this.

Description of the Related Art

An operation dial for a user's operation is provided in a small electronic apparatus like a camera. An operation dial that enables infinite rotation is used when a user sets a numerical value etc. Another operation dial on which modes or set values are printed is used when a user selects a mode of an apparatus. There are various detection methods for the former dial (relative position detection dial) that enables infinite rotation and inputs a set value by a user's operation. In the meantime, a contact dial with a brush and a conductive pad is widely used as the later dial (absolute position detection dial) that sets up a mode or a set value depending on a rotational position of the dial.

The contact dial is deficient in durability because a slide part, which is essential due to the nature, wears. Accordingly, a noncontact dial that is able to detect an absolute position is required.

Japanese Laid-Open Patent Publication (Kokai) No. H5-45179 (JP H5-45179A) discloses a technique of non-contact detection of an absolute rotation position in a rotary action of a measurement object using a light projecting-and-receiving element and a pattern (detection scale) that is attached to the measurement object so that a reflected light amount or a transmitted light amount from the pattern varies depending on a position. Moreover, Japanese Laid-Open Patent Publication (Kokai) No. 2013-83597 (JP 2013-83597A) discloses a technique that counteracts an error caused by a positional deviation in assembly or by temperature change in absolute position detection in a linear direction by using sum and difference of two same position sensors.

The above-mentioned JP H5-45179A has a problem in that the absolute position is misread when the relative position between the detection scale attached to a rotation member as the measurement object and the light projecting-and-receiving element is deviated. This is because the cause of the deviation of the relative position between the light projecting-and-receiving element and the detection scale cannot be determined as the rotary action of the rotation member, or play or thermal expansion of the rotation member. This may cause a problem that a deviation of an output of a rotation angle detection device caused by the play or thermal expansion of the rotation member is detected as a change of the rotational position of the rotation member by an operation.

In the meantime, the technique in the above-mentioned JP 2013-83597A needs to arrange two sensors side by side in a radial direction of the rotation member when the absolute position detection method is used for a rotary action of a dial. Accordingly, when a space for wiring etc. is taken into consideration, it may be difficult to arrange the sensors for a rotation member with a small radius. Moreover, the sensors may not obtain accurate light amounts when light beams that are projected by light projection members interfere mutually.

SUMMARY OF THE INVENTION

The present invention provides a rotation angle detection device and an electronic apparatus using this, which are capable of detecting an absolute rotation position with a high accuracy without an error and of miniaturizing.

Accordingly, an aspect of the present invention provides a rotation angle detection device comprising a rotation member configured to allow a rotational operation, a rotation detection target configured to rotate together with the rotation member and to have at least two detection scales formed around a rotation axis of the rotation member including an outer scale provided in a radially outer portion and an inner scale provided in a radially inner portion, two rotation detection elements configured to be arranged at opposite positions across the rotation axis in the radial direction of the rotation detection target so as to respectively irradiate the outer scale and the inner scale with light beams and to output signals corresponding to reflected components, and a control unit configured to calculate a rotation angle of the rotation detection target using the signals output from the two rotation detection elements. The outer scale and the inner scale are so formed that a signal output from one of the two rotation detection elements increases and the signal output from the other decreases when the rotation member is rotated.

Accordingly, a second aspect of the present invention provides an electronic apparatus having the rotation angle detection device of the first aspect.

According to the present invention, a rotation angle detection device and an electronic apparatus using this, which are capable of detecting an absolute rotation position with a high accuracy without an error and of miniaturizing are provided.

Further features of the present invention will become apparent from the following description of exemplary embodiments with reference to the attached drawings.

DESCRIPTION OF THE EMBODIMENTS

Hereafter, embodiments according to the present invention will be described in detail with reference to the drawings.

Figure 1A:
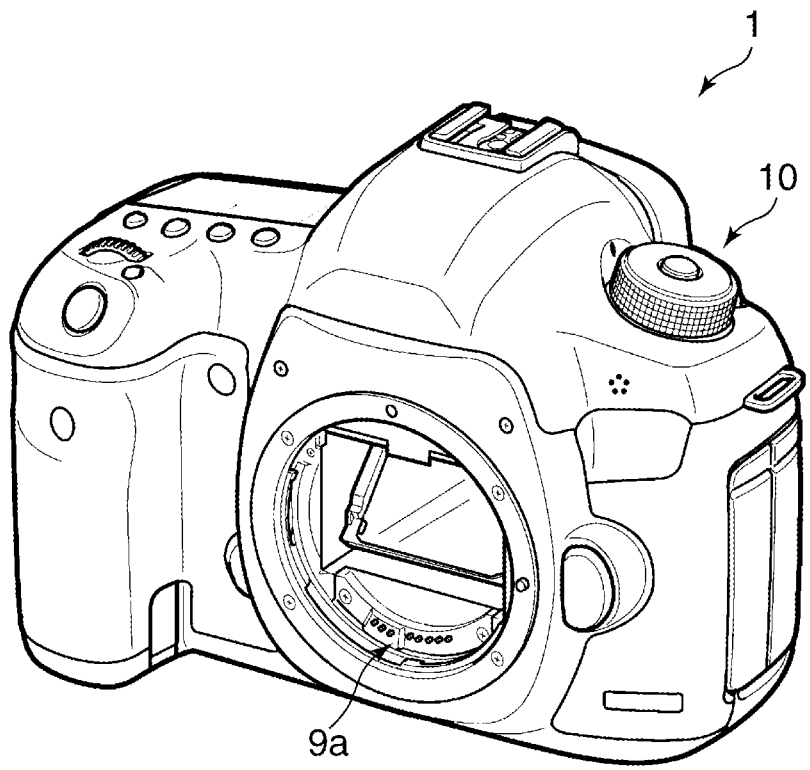
FIG. 1A is a perspective view showing a camera body of a digital camera that is an electronic apparatus equipped with a rotation angle detection device according to a first embodiment of the present invention.
Figure 1B:
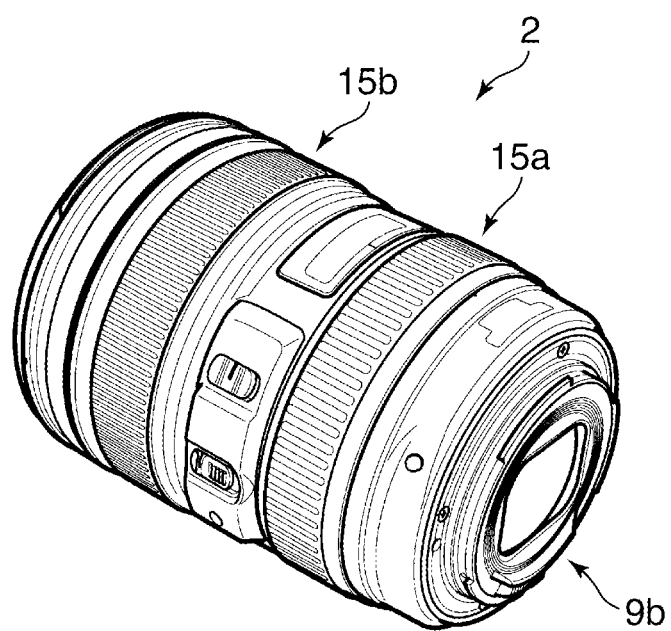
FIG. 1B is a perspective view showing a lens unit that is detachably attached to the camera body shown in FIG. 1A.

FIG. 1A is a perspective view showing a camera body of a digital camera that is an electronic apparatus equipped with a rotation angle detection device according to a first embodiment of the present invention. FIG. 1B is a perspective view showing a lens unit that is detachably attached to the camera body shown in FIG. 1A. Although the digital camera that is an example of an image pickup apparatus is exemplified as an electronic apparatus in the first embodiment, the present invention is not limited to this.

As shown in FIG. 1A and FIG. 1B, the digital camera of the first embodiment is configured by detachably attaching a lens unit 2 to a front side of a camera body 1. In this attached state, an electrical contact 9a of the camera body 1 is electrically connected with an electrical contact 9b of the lens unit 2. This enables communication between the camera body 1 and the lens unit 2. An operation dial 10 is provided in a top surface of the camera body 1. The operation dial 10 is a mode dial that selects a photographing mode from among programmed AE, shutter priority AE, aperture priority AE, manual exposure, etc. corresponding to a user's rotational operation. The operation dial 10 is equivalent to an example of a rotation member of the present invention.

A zoom operation ring 15a that changes a focal length by a rotational operation and a focus operation ring 15b that adjusts a focus position by a rotational operation are provided in an outer periphery of the lens unit 2.

Figure 2A:
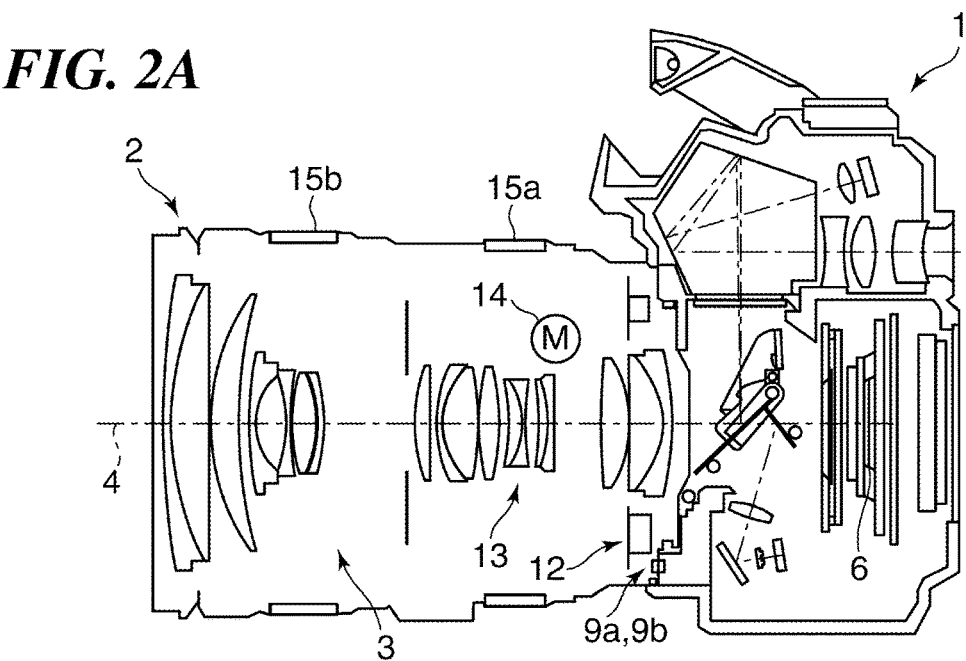
FIG. 2A is a sectional view schematically showing the digital camera of the first embodiment.
Figure 2B:
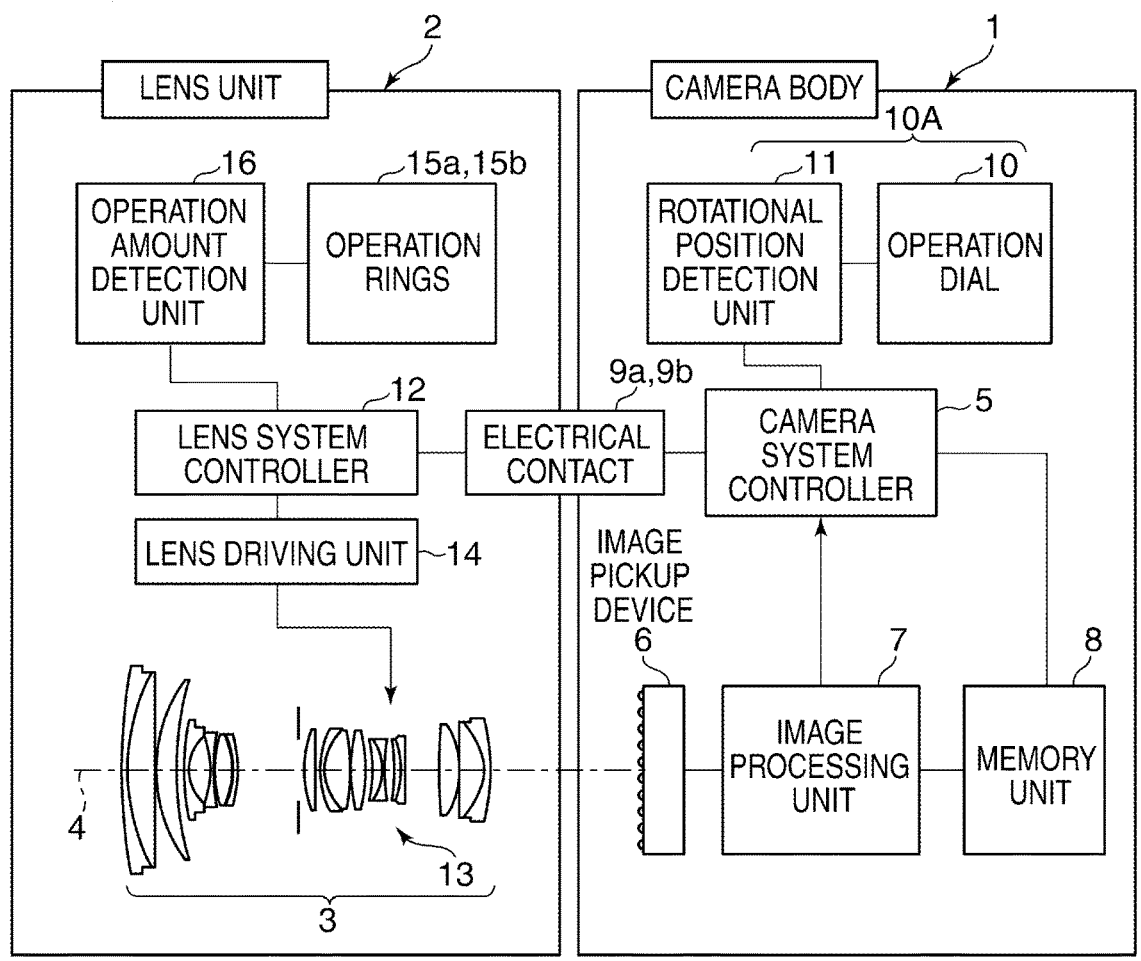
FIG. 2B is a block diagram showing an electric configuration of the digital camera shown in FIG. 2A.

FIG. 2A is a sectional view schematically showing the digital camera. FIG. 2B is a block diagram showing an electric configuration of the digital camera. As shown in FIG. 2A, the lens unit 2 has a photographing optical system 3 that consists of a plurality of lenses. The photographing optical system 3 includes a focusing lens 13. Moreover, the camera body 1 has an image pickup device 6 that converts photoelectrically an object image formed through the photographing optical system 3. A display unit (not shown) that is constituted by a liquid crystal display is provided in a back side of the camera body 1.

As shown in FIG. 2B, the camera body 1 has a camera system controller 5, an image processing unit 7, a memory unit 8, a rotational position detection unit 11, etc. The camera system controller 5 manages control of the entire camera. The rotational position detection unit 11 detects a rotation angle of the operation dial 10.

Symbols that represent the photographing modes are printed on the surface of the operation dial 10. A user sets a desired photographing mode by rotating the operation dial 10 so that the symbol of the desired photographing mode matches an index provided outside the operation dial 10. This needs absolute angle detection about the rotation angle of the operation dial 10, and the rotational position detection unit 11 has a configuration that enables the absolute angle detection. In the description, the operation dial 10 and the rotational position detection unit 11 constitute a rotation angle detection device 10A. Details of the operation dial 10 and the rotational position detection unit 11 are mentioned later.

The image processing unit 7 includes an A/D converter, a white balance adjustment circuit, a color interpolation processing circuit, a gamma correction circuit, an interpolation arithmetic circuit, etc., and is able to generate an image for recording. The color interpolation processing circuit generates a color image by applying a color interpolation (demosaicing) process to a signal of a Bayer arrangement. Moreover, the image processing unit 7 compresses an image, a moving image, a sound, etc. using a method defined beforehand.

The lens unit 2 has an operation amount detection unit 16, a lens system controller 12, a lens driving unit 14, etc. The lens system controller 12 controls the lens driving unit 14, and communicates with the camera system controller 5 in the camera body through the electrical contacts 9a and 9b. The lens driving unit 14 drives the focusing lens 13, an image stabilization lens, a diaphragm, etc. The operation amount detection unit 16 detects rotational operation amounts of the zoom operation ring 15a and the focus operation ring 15b.

Figure 3A:
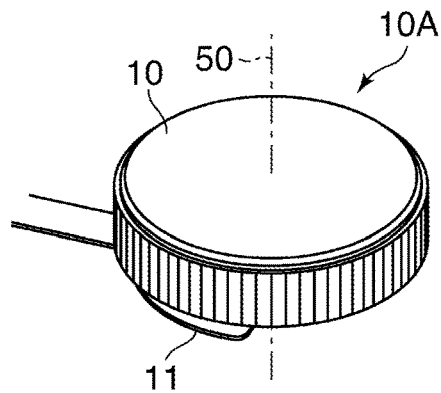
FIG. 3A through FIG. 3E are views for describing the rotation angle detection device of the digital camera according to the first embodiment.
Figure 3B:
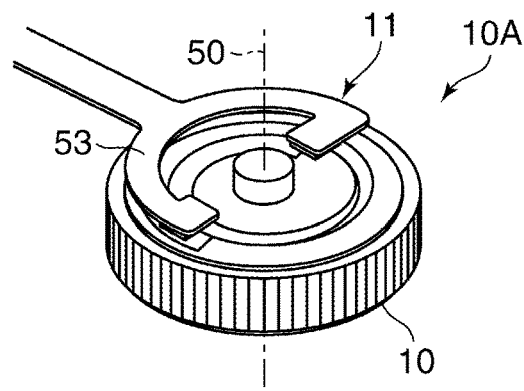
Figure 3C:
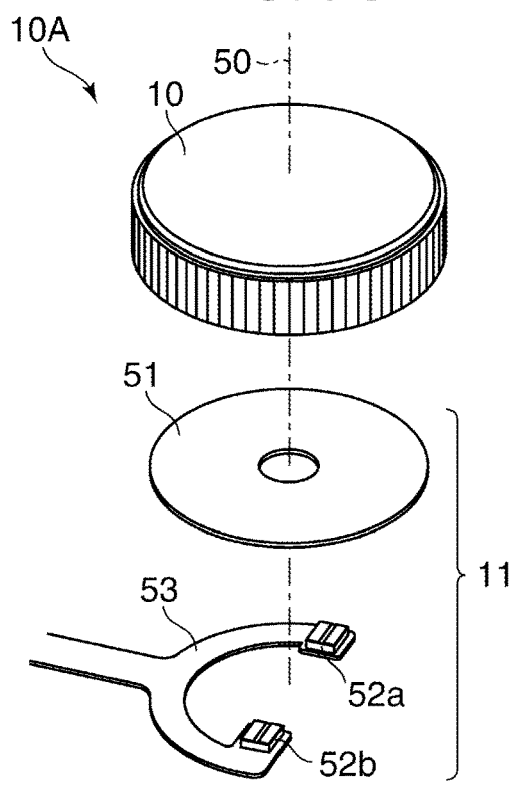
Figure 3D:
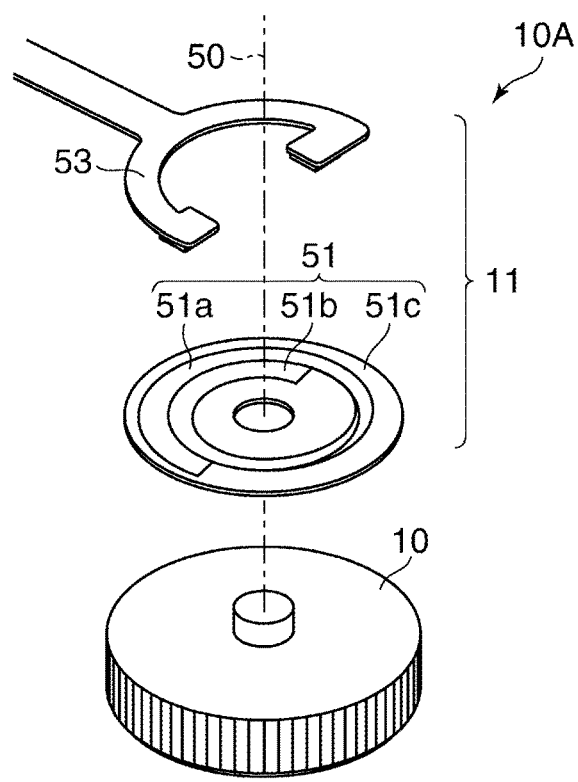
Figure 3E:
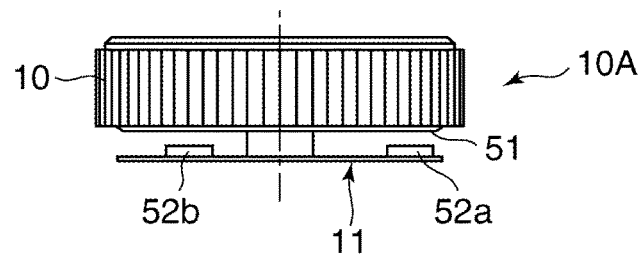

FIG. 3A is a perspective view showing the rotation angle detection device 10A. FIG. 3B is a perspective view showing the rotation angle detection device 10A that is viewed from a back side. FIG. 3C is an exploded perspective view showing the rotation angle detection device 10A. FIG. 3D is an exploded perspective view showing the rotation angle detection device 10A that is viewed from the back side. FIG. 3E is a view showing the rotation angle detection device 10A that is viewed from an outside in a radial direction.

As shown in FIG. 3A through FIG. 3E, the operation dial 10 is rotationally operated around a rotation axis 50. A rotation detection target 51 rotates together with the operation dial 10. The rotation detection target 51 has a base member 51c fixed to the back of the operation dial 10. An outer scale 51a is fixed to an outer portion of the base member 51c in the radial direction, and an inner scale 51b is fixed to an inner portion of the base member 51c in the radial direction.

A flexible substrate 53 is fixed to the image pickup device 6, and rotation detection elements 52 are implemented in the flexible substrate 53. The rotation detection elements 52 includes an outer rotation detection element 52a arranged at an outer portion in the radial direction and an inner rotation detection element 52b arranged at an inner portion in the radial direction.

The outer scale 51a faces the outer rotation detection element 52 in the axial direction of the rotation axis 50, and the inner scale 51b faces the inner rotation detection element 52b in the axial direction of the rotation axis 50. In response to rotation of the rotation detection target 51 (rotation of the operation dial 10), the outer rotation detection element 52a and the inner rotation detection element 52b output electrical signals corresponding to the outer scale 51a and the inner scale 51b that face, respectively.

The signals output from the outer and inner rotation detection elements 52a and 52b are sent to the camera system controller 5 through the flexible substrate 53, and the camera system controller 5 calculates the absolute rotation position of the operation dial 10 to the camera body 1 on the basis of the signals.

The outer rotation detection element 52a and the inner rotation detection element 52b are provided at positions that are opposite across the rotation axis 50 in the radial direction and are different in distance from the center. Moreover, each of the outer scale 51a and the inner scale 51b of the rotation detection target 51 is formed of material of which reflectance is different from the base member 51c so that the reflectance varies gradually according to the rotation of the rotation detection target 51.

In the example shown in FIG. 3A through FIG. 3E, the outer scale 51a and the inner scale 51b are formed in convex shapes with respect to the base member 51c in the direction parallel to the rotation axis 50. The shape of each of the scales 51a and 51b is constituted so that a slant face is formed in the rotational direction around the rotation axis 50 (i.e., so that the width in the radial direction varies in the rotational direction). It should be noted that each of the outer rotation detection element 52a and the inner rotation detection element 52b consists of a light emitting element and a photodiode. The outer rotation detection element 52a irradiates the outer scale 51a with an infrared light beam and generates a signal (electric current) corresponding to the intensity of the reflected component. The inner rotation detection element 52b irradiates the inner scale 51b with an infrared light beam and generates a signal (electric current) corresponding to the intensity of the reflected component.

The outer scale 51a and the inner scale 51b are protruded to be respectively close to the outer rotation detection element 52a and the inner rotation detection element 52b from the base member 51c. Accordingly, the intensities of the reflected components of the infrared light beams emitted from the outer rotation detection element 52a and the inner rotation detection element 52b vary according to the slant faces (i.e., according to the widths in the radial direction) of the outer scale 51a and the inner scale 51b.

Although the outer scale 51a and the inner scale 51b are protruded from the base member 51c in the first embodiment, another method may be employed as long as the reflectances vary gradually in the rotational direction. For example, a scale of which reflectance varies in the rotational direction is achieved by painting of the similar shape.

Next, details of the absolute rotation position detection by the combination of the rotation detection element and the detection scale will be described with reference to FIG. 4A through FIG. 7D.

Rotation angle detection devices of related arts will be described first with reference to FIG. 4A and FIG. 4B. It should be noted that FIG. 4A and FIG. 4B are views mainly showing rotation detection targets in the rotation angle detection devices of the related arts and are equivalent to the view showing the rotation detection target 51 in FIG. 3D that is viewed in the direction of the rotation axis 50.

Figure 4A:
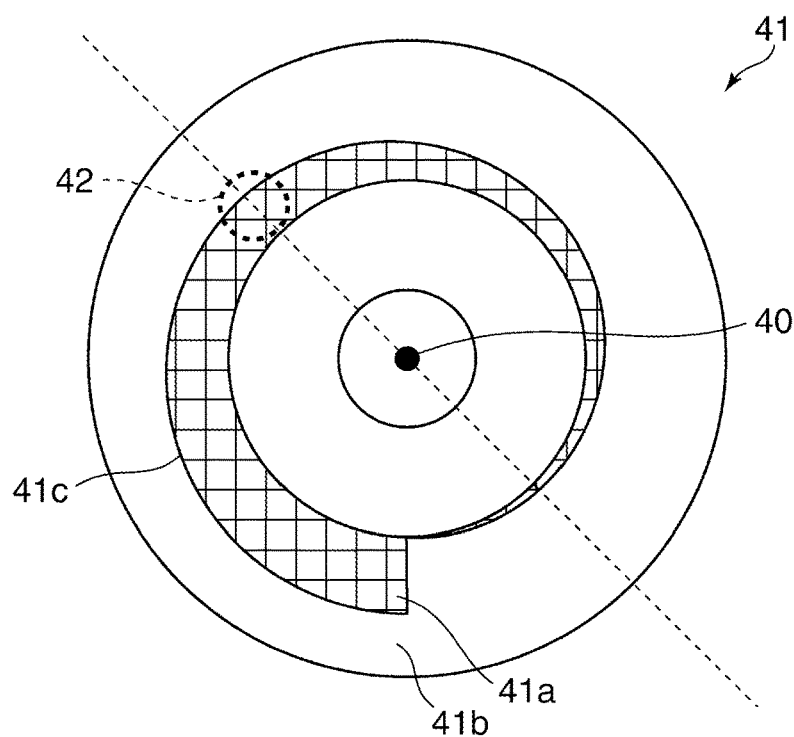
FIG. 4A and FIG. 4B are views for describing of rotational angle detection devices of related arts.
Figure 4B:
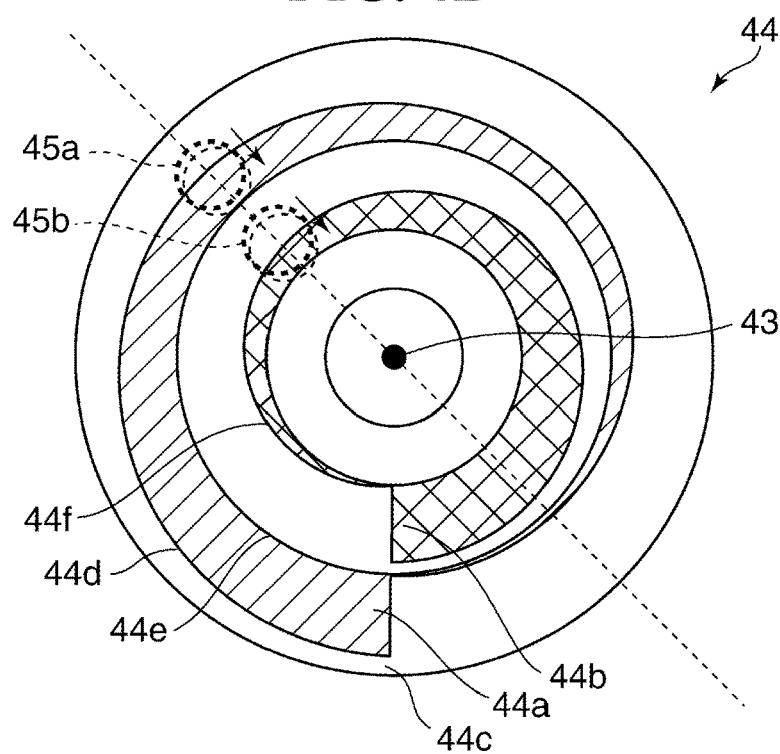

FIG. 4A is a view for describing the rotation angle detection device that detects the absolute rotation position in a case where one rotation detection element is used. FIG. 4B is a view showing the rotation angle detection device that develops a mechanism for detecting an absolute position using two rotation detection elements onto a circumference.

FIG. 4A schematically shows a rotation axis 40, a rotation detection target 41, and a light irradiation region 42 that is currently irradiated with a light beam emitted from a rotation detection element (not shown). A detection scale 41a is formed on a base member 41b of the rotation detection target 41. An outer edge 41c is defined at the outer side of the detection scale 41a in the radial direction. As shown in FIG. 4A, there is only one light irradiation region 42 because only one rotation detection element is used. The configuration of the rotation detection target 41 is similar to the first embodiment shown in FIG. 3D except there is one detection scale.

The detection scale 41a is formed so that a distance to the radially outer edge 41c from the rotation axis 40 (i.e., width of the detection scale 41a) varies in the rotational direction around the rotation axis 40. That is, the ratio of the detection scale 41a in the light irradiation region 42 varies according to the rotation of the rotation detection target 41. Thereby, the area of the overlapped region between the detection scale 41a (hatching portion) and the light irradiation region 42 varies according to the rotation of the rotation detection target 41.

Accordingly, the intensity of the reflected component in the rotation detection element (not shown) varies, which changes the electric current detected. The area of the overlapped region between the detection scale 41a and the light irradiation region 42 is given uniquely according to the rotation of the rotation detection target 41. Accordingly, the rotation of the rotation detection target 41 becomes detectable as an absolute angle by reading the output current of the rotation detection element.

However, in a case where only one rotation detection element is provided as shown in FIG. 4A, when the rotation detection target 41 moves with respect to the rotation detection element due to backlash, for example, the amount of the backlash may be misdetected as the rotation amount of the rotation detection target 41.

As a solution to such a problem, there is a considerable method that distinguishes positional deviation between a rotation detection element and a rotation detection target from rotation of the rotation detection target by using two detection elements so as to mutually correct the output signals. FIG. 4B shows an example in which one of such methods is adapted for the configuration of a rotation angle detection.

FIG. 4B schematically shows a rotation axis 43, a rotation detection target 44, and light irradiation regions 45a and 45b that are currently irradiated with a light beam emitted from rotation detection elements (not shown). The rotation detection target 44 has two detection scales that are an outer scale 44a (bias hatching part in FIG. 4B) provided in an outer portion of a base member 44c in the radial direction and an inner scale 44b (meshed hatching part in FIG. 4B) provided in an inner portion of the base member 44c.

An outer edge 44d is defined at the outer side of the outer scale 44a in the radial direction, an inner edge 44e is defined at the inner side of the outer scale 44a in the radial direction, and an outer edge 44f is defined at the outer side of the inner scale 44b in the radial direction. The light irradiation region 45a is an outer light irradiation region that faces the outer scale 44a. The light irradiation region 45b is an inner light irradiation region that faces the inner scale 44b.

As shown in FIG. 4B, the outer scale 44a and the inner scale 44b are formed so that a distance to the radially outer edge 44d of the outer scale 44a from the rotation axis 43 and a distance to the radially outer edge 44f of the inner scale 44b from the rotation axis 43 vary in the rotational direction. Accordingly, the respective ratios of the detection regions of the scales 44a and 44b to the light irradiation regions 45a and 45b vary according to the rotation of the rotation detection target 44.

Moreover, the change of the inclination (the change of the distance from the rotation axis 43) of the radially outer edge 44d of the outer scale 44a in the rotational direction is opposite to the change of the inclination of the radially outer edge 44f of the inner scale 44b. Accordingly, the output signal of the outer rotation detection element that faces the outer scale 44a and the output signal of the inner rotation detection element that faces the inner scale 44b vary in the mutually opposite directions according to the rotation of the rotation detection target 44. That is, the rotation detection elements are arranged so that the output signal of the inner rotation detection element decreases according to the rotation in a certain rotational direction when the output signal of the outer rotation detection element increases.

Such an arrangement enables distinguishment of the positional deviation between the rotation detection element and the rotation detection target 44 from the rotation of the rotation detection target 44.

For example, a case where the rotation detection target 44 slightly moves with respect to the rotation detection elements (not shown) in the upper-left direction in the drawing along a broken line in FIG. 4B is assumed. Since this is equivalent to the relative movements of the outer light irradiation region 45a and the inner light irradiation region 45b in the direction of arrows in FIG. 4B, the following is described as such. In this case, the area of the overlapped region between the outer scale 44a and the light irradiation region 45a becomes large, and the area of the overlapped region between the inner scale 44b and the inner light irradiation region 45b also becomes large.

Since the area of the outer light irradiation region 45a is considered to be almost equal to the area of the inner light irradiation region 45b in a case where the same rotation detection elements are used, the change amounts of the output signals of the rotation detection elements are considered to become almost equal. That is, the area of the overlapped region between the outer light irradiation region 45a and the outer scale 44a is considered to be almost equal to the area of the overlapped region between the inner light irradiation region 45b and the inner scale 44b. Accordingly, the difference between the output signals of the rotation detection elements does not vary mostly even if the position of the rotation detection target 44 varies slightly, and it keeps a certain value.

The above-mentioned contents will be described using formulas. The output signal of the rotation detection element that faces the outer scale 44a is represented by Va and the output signal of the rotation detection element that faces the inner scale 44b is represented by Vb. The output signal Va' of the rotation detection element that faces the outer scale 44a and the output signal Vb' of the rotation detection element that faces the inner scale 44b when the rotation detection target 44 slightly moves in the upper-left direction in the drawing along the broken line in FIG. 4B are represented by the following formulas, respectively.

$$Va' = Va + \Delta Va \quad (1)$$

$$Vb' = Vb + \Delta Vb \quad (2)$$

In the formulas, $\Delta Va$ denotes a change amount of the output signal of the rotation detection element that faces the outer scale 44a, and $\Delta Vb$ denotes a change amount of the output signal of the rotation detection element that faces the inner scale 44b. Moreover, the change amounts of the output signals of the rotation detection elements are equal to each other as mentioned above. That is, since $\Delta Va$ is equal to $\Delta Vb$, a difference between the formulas (1) and (2) is represented by the following formula (3).

$$Va' - Vb' = Va - Vb \quad (3)$$

In this way, even when the rotation detection target 44 causes position change with respect to the rotation detection elements due to backlash etc., the variations of the output signals of the rotation detection elements due to the position change are canceled by taking the difference of the output signals of the two rotation detection elements. This enables distinguishment of the relative position change between the rotation detection element and the rotation detection target 44 from the rotation of the rotation detection target 44. The cancelling of an error due to position change by taking a difference between the output signals of the two rotation detection elements is equivalent to the calculation of the rotation angle using the difference between the output signals of the two rotation detection elements as mentioned above.

It is described that the photodiode is used for the rotation detection element in FIG. 3A through FIG. 3E. In general, an output signal of a photodiode varies depending on environmental temperature. Use of the two rotation detection elements is able to cancel influence of the temperature change. As mentioned above, the change of the inclination (the change of the distance from the rotation axis 43) of the radially outer edge 44d of the outer scale 44a in the rotational direction is opposite to the change of the inclination of the radially outer edge 44f of the inner scale 44b. That is, the rotation detection elements are arranged so that the output signal of the inner rotation detection element decreases according to the rotation in a certain rotational direction when the output signal of the outer rotation detection element increases.

The total value of both the output signals becomes constant when change amounts of the output signals in response to change of the rotation angle are matched (the output signals vary from the lower limit level to the upper limit level by one rotation in the drawing). Accordingly, when the output signals of the rotation detection elements vary in response to the change of environmental temperature, the change amounts of the output signals corresponding to the change of environmental temperature are calculated by comparing the total values of both the output signals before and after the temperature change. The cancelling of an error due to temperature change by taking the sum of the output signals of the two rotation detection elements is equivalent to the calculation of the rotation angle using the sum of the outputs of the two rotation detection elements as mentioned above.

In this way, use of the two rotation detection elements is able to cancel an error due to the position change between the rotation detection elements and the rotation detection target 44 and an error due to change of environmental temperature as described with reference to FIG. 4B. In the meantime, the configuration in FIG. 4B has a problem in that the light irradiation regions by the two rotation detection elements are too close. Since a photodiode outputs a signal corresponding to an intensity of a reflected component of a projected light beam, it has such a characteristic that noise is given to the output signal when extraneous light enters into a light irradiation region.

Accordingly, when the light irradiation regions are aligned side by side as shown in FIG. 4B, it is necessary to keep a gap between the regions in order to avoid interference of both the projected light beams. As shown in FIG. 4B, it is necessary to keep a gap between the radially inner edge 44e of the outer scale 41a and the radially outer edge 44f of the inner scale 41b so as to avoid interference between the light irradiation region 45a and the light irradiation region 45b. Accordingly, there are problems in the noise of the output signal and in miniaturization.

Figure 5:
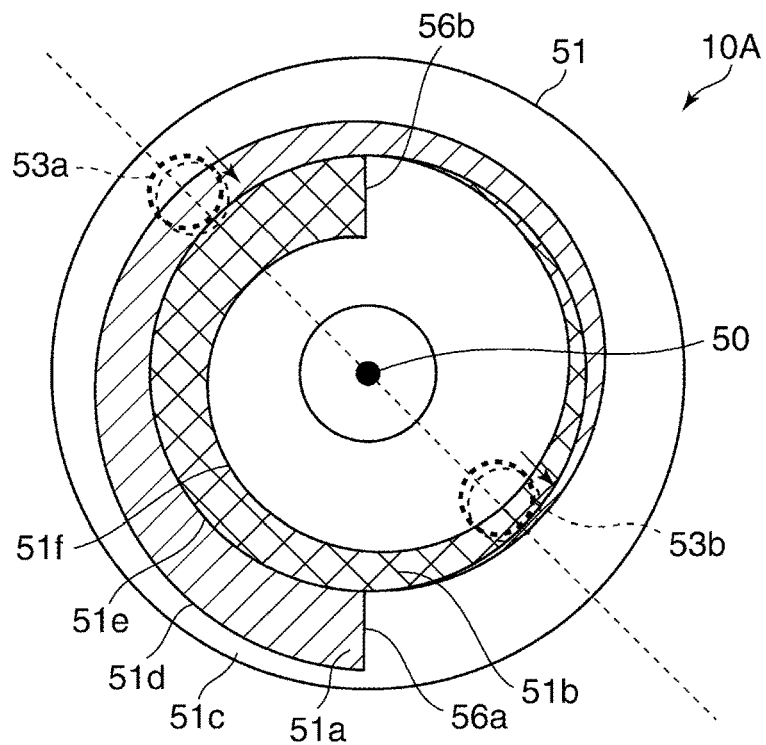
FIG. 5 is a view showing the rotational angle detection device shown in FIG. 3A through FIG. 3E that is viewed from a back side of an operation dial.

Next, the rotation angle detection device 10A shown in FIG. 3A through FIG. 3E will be described in detail with reference to FIG. 5. FIG. 5 is the view showing the rotation angle detection device 10A that is viewed from a back side of the operation dial 10. As shown in FIG. 5, an outer light irradiation region 53a is irradiated with a projected light beam from the outer rotation detection element 52a (see FIG. 3C) that faces the outer scale 51a.

Moreover, an inner light irradiation region 53b is irradiated with a projected light beam from the inner rotation detection element 52b (see FIG. 3C) that faces the inner scale 51b. A radially outer edge 51d and a radially inner edge 51e of the outer scale 51a are defined. A radially inner edge 51f of the inner scale 51b is defined.

Moreover, as shown in FIG. 5, the change of the inclination (the change of the distance from the rotation axis 50) of the radially outer edge 51d of the outer scale 51a in the rotational direction is opposite to the change of the inclination of the radially inner edge 51f of the inner scale 51b as with FIG. 4B.

For example, when the rotation detection target 51 rotates in the clockwise direction in FIG. 5, the distance from the rotation axis 50 to the radially outer edge 51d of the outer scale 51a increases, but the distance from the rotation axis 50 to the radially inner edge 51f of the inner scale 51b decreases. That is, the outer scale 51a and the inner scale 51b are provided so that the output signal of one of the rotation detection elements 52a and 52b (see FIG. 3C) increases when the output signal of the other rotation detection element decreases.

Accordingly, even if the rotation detection target 51 moves relative to the two rotation detection elements 52a and 52b due to backlash etc., error influence is canceled in the same manner as the case of FIG. 4B. That is, distinguishment of relative positional deviation between the rotation detection elements 52a and 52b and the rotation detection target 51 from rotation of the rotation detection target 51 is enabled by taking a difference between the output signals of the two rotation detection elements 52a and 52b.

Moreover, since the total value of the output signals of the two rotation detection elements 52a and 52b is constant, change of output signal of a photodiode due to change of environmental temperature is easily corrected as with the case of FIG. 4B.

In the meantime, FIG. 5 differs from FIG. 4B in that the outer scale 51a and the inner scale 51b are so formed that the rotational positions across which the output signals of the two rotation detection elements 52a and 52b vary between the upper limit level and the lower limit level are opposite across the rotation axis 50 in the radial direction. In other words, a position 56a where the distance from the rotation axis 50 to the radially outer edge 51d of the outer scale 51a varies discontinuously and a position 56b where the distance from the rotation axis 50 to the radially inner edge 51f of the inner scale 51b varies discontinuously are mutually opposite in the radial direction.

Such a configuration allows the two rotation detection elements 52a and 52b to be arranged at the opposite positions across the rotation axis 50 in the radial direction, which enables the light irradiation regions 53a and 53b to be located at mutually separate positions. Accordingly, since there is no possibility that an error due to interference of the projected light beams is detected, a rotational position is detected with sufficient accuracy. Moreover, it becomes unnecessary to keep a gap between the scales in the radial direction, which becomes advantageous also in respect of a radial miniaturization. In FIG. 5, the radially inner edge 51e of the outer scale 51a coincides with the radially outer edge in the inner scale 51b.

As described above, the first embodiment provides the rotation angle detection device 10A that detects an absolute rotation position with high accuracy without an error and attains miniaturization.

Next, a digital camera that is a second embodiment of an electronic apparatus equipped with a rotation angle detection device of the present invention will be described with reference to FIG. 6. It should be noted that the same reference numerals are attached to duplicated sections or corresponding sections with respect to the above-mentioned first embodiment and their descriptions are omitted.

Figure 6:
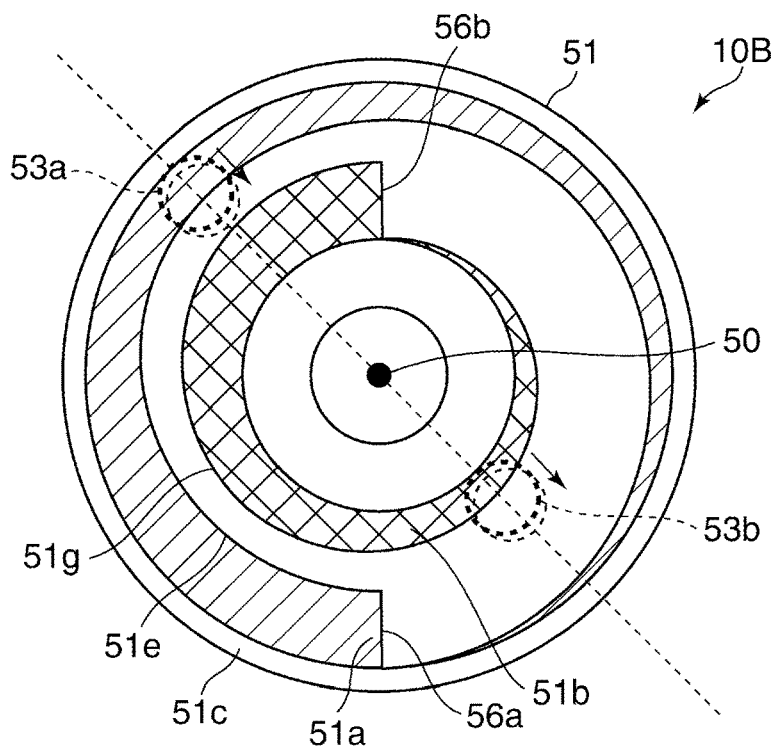
FIG. 6 is a view showing a rotation angle detection device that is viewed from a back side of an operation dial in a digital camera that is an electronic apparatus equipped with the rotation angle detection device according to a second embodiment of the present invention.

FIG. 6 is a view showing the rotation angle detection device 10B of the second embodiment that is viewed from a back side of the operation dial 10. In the rotation angle detection device 10B of the second embodiment, the outer scale 51a is separated from the inner scale 51b in the radial direction and a gap is kept between the radially inner edge 51e of the outer scale 51a and the radially outer edge 51g of the inner scale 51b. In the second embodiment, unlike the above-mentioned first embodiment, when the rotation detection target 51 rotates in the clockwise direction, the distance from the rotation axis 50 to the radially inner edge 51e of the outer scale 51a increases, but the distance from the rotation axis 50 to the radially outer edge 51g of the inner scale 51b decreases.

However, it is the same that distinguishment of relative positional deviation between the rotation detection elements 52a and 52b (see FIG. 3C) and the rotation detection target 51 from rotation of the rotation detection target 51 is enabled by taking a difference between the output signals of the two rotation detection elements 52a and 52b. Similarly, since the total value of the output signals of the two rotation detection elements 52a and 52b is constant, change of output signal of a photodiode due to change of environmental temperature is easily corrected.

The two rotation detection elements 52a and 52b are arranged at the opposite positions across the rotation axis 50 in the radial direction in the second embodiment as with the above-mentioned first embodiment. Accordingly, since the light irradiation regions 53a and 53b are formed at mutually separate positions, there is no possibility that an error due to interference of the projected light beams of the rotation detection elements 52a and 52b is detected, and a radial miniaturization is also available. The other configurations and operation effects are the same as that of the above-mentioned first embodiment.

Next, a digital camera that is a third embodiment of an electronic apparatus equipped with a rotation angle detection device of the present invention will be described with reference to FIG. 7A through FIG. 7D. It should be noted that the same reference numerals are attached to duplicated sections or corresponding sections with respect to the above-mentioned first embodiment and their descriptions are omitted.

In an actual configuration of the rotation angle detection device, the rotation detection element 52a is fixed to the camera body 1. Then, the rotation detection target 51 rotates with respect to the rotation detection element 52a. In the meantime, FIG. 7A through FIG. 7D are illustrated assuming that the rotation detection element 52a (i.e., the light irradiation region 53a) moves relative to the rotation detection target 51. Although the rotation detection element 52a among the rotation detection elements 52a and 52b is described in the third embodiment, the same description is applicable to the rotation detection element 52b.

Figure 7A:
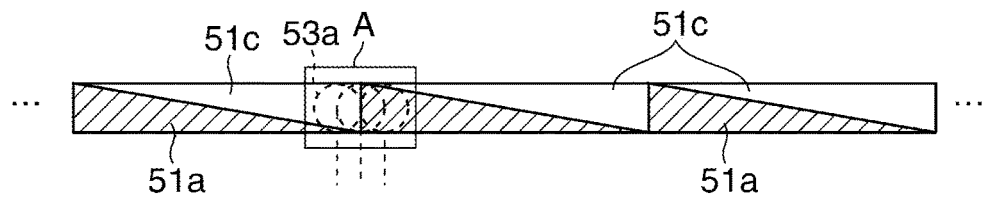
FIG. 7A through FIG. 7D is a view for describing a rotation angle detection device in a digital camera that is an electronic apparatus equipped with the rotation angle detection device according to a third embodiment of the present invention.
Figure 7B:
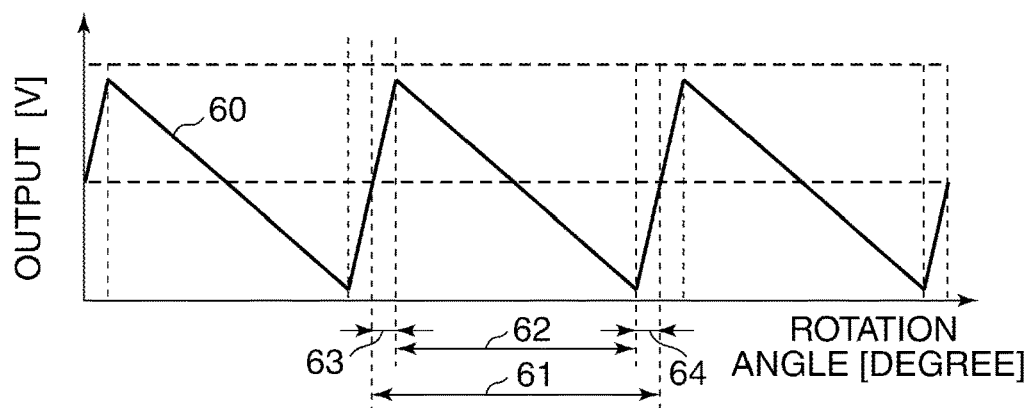

FIG. 7A is a view schematically showing the outer scale 51a and the base member 51c that are continuously repeated in a case of infinite rotation of the rotation detection target 51 and that are viewed from the rotation detection element 52a. It should be noted that the outer scale 51a shown in FIG. 7A is so formed that the distance from the rotation axis 50 to the outer edge of the outer scale 51a varies according to the rotation in the same manner as the outer scale 51a of the first embodiment shown in FIG. 5. FIG. 7B is a graph schematically showing relationship between a rotation angle at which the rotation detection element 52a in FIG. 7A is located and the output signal of the rotation detection element 52a.

Figure 7C:
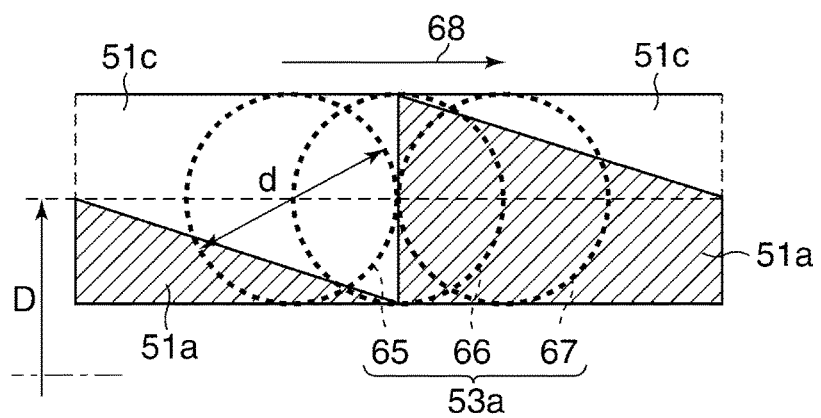
Figure 7D:
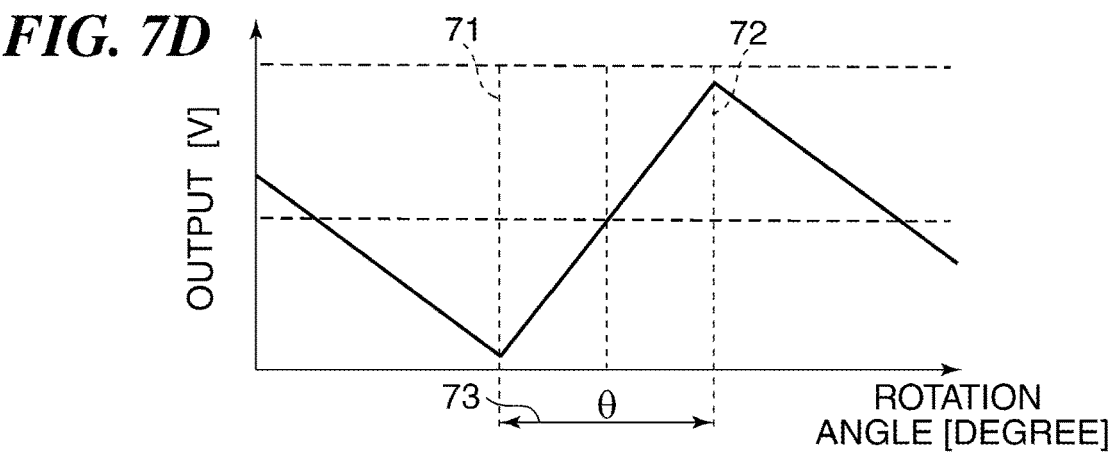

FIG. 7C is an enlarged view of a section A in FIG. 7A showing behaviors of the outer scale 51a and the light irradiation region 53a near an edge (hereinafter referred to as a detection edge) where the width of the outer scale 51a varies discontinuously. FIG. 7D is a graph schematically showing relationship between the output signal of the rotation detection element 52a and the rotation angle in FIG. 7C.

As shown in FIG. 7A, when the rotation detection target 51 is rotated more than 360 degrees, the detection edge of the outer scale 51a is detected. Accordingly, when the operation dial 10 rotates infinitely, the outer scale 51a exhibits the same pattern for every rotation. Accordingly, the output signal of the rotation detection element 52a repeats the same pattern as shown by a waveform 60 in FIG. 7B.

In FIG. 7B, an arrow 61 indicates a rotation angle range in which the center of the rotation detection element 52a (i.e., the center of the light irradiation region 53a) moves relatively from the detection end of the outer scale 51a to the detection end after one rotation, and indicates the rotation angle range of 360 degrees. Although an output signal of the rotation detection element 52a is given uniquely corresponding to the rotation angle in a range denoted by an arrow 62, a signal output in ranges denoted by arrows 63 and 64 may coincide with a signal output in the range 62. This is caused by the certain size of the light irradiation region 53. Its details will be described with reference to FIG. 7C.

In FIG. 7C, an arrow 68 indicates the moving direction of the light irradiation region 53a. The right edge of the light irradiation region 53a meets the detection edge of the outer scale 51a at a position 65. The center of the light irradiation region 53a coincides with the detection edge of the outer scale 51a at a position 66. The left edge of the light irradiation region 53a meets the detection edge of the outer scale 51a at a position 67.

Moreover, a symbol d denotes the diameter of the light irradiation region 53a, and a symbol D denotes the diameter (the radius is defined as a distance from the rotation axis 50 to a midpoint between the circumscribed circle and the inner edge of the outer scale 51a) of the outer scale 51a around the rotation axis 50. As described with reference to FIG. 7B, since the light irradiation region 53a has the certain size (diameter d), the output signal of the rotation detection element 52a increases between the position 65 at which the light irradiation region 53a starts to overlap with the detection edge and the position 67 at which the light irradiation region 53a completely traverses the detection edge.

Assuming that the output signal of the rotation detection element 52a is considered as an area of the light irradiation region 53a overlapped with the outer scale 51a as with the case in FIG. 4B, the output signal is minimized when the light irradiation region 53a moving in the direction of the arrow 68 is at the position 65. After that, the output signal takes the middle level between the upper limit level and the lower limit level at the position 66 of the light irradiation region 53a. The output signal varies so as to take the upper limit level at the position 67 of the light irradiation region 53a.

In FIG. 7D, a rotation angle 71 corresponds to the position 65 of the light irradiation region 53a and a rotation angle 72 corresponds to the position 67 of the light irradiation region 53a. The output signal continuously increases in a rotation angle range indicated by an arrow 73 between the angles 71 and 72.

Although the actual output waveform is indicated by a high order polynomial, the waveform in FIG. 7B is indicated by a line shape for simplification. Moreover, the rotation angle range $\theta$ near the detection end denoted by the arrow 73 is represented by the following formula (4) using the diameter d of the light irradiation region 53a and the diameter D of the outer scale 51a.

$$\theta = 2*\text{Arcsin}(d/D) \tag{4}$$

In this way, since an output signal in the rotation angle range $\theta$ coincides with an output signal in the range other than the rotation angle range $\theta$ within a rotation angle range shorter than one rotation, the detection edge is preferably located at the rotation angle that is not detected by the rotation detection element 52a. Accordingly, when the rotation detection target 51 does not rotate infinitely, the detection edge across which the output signal of the rotation detection element 52a varies between the lower limit level and the upper limit level is preferably located in a non-detection range that does not need to detect a rotation angle. A rotation angle in the non-detection range is not set by a user's operation. The other configurations and operation effects are the same as that of the above-mentioned first embodiment.

Next, a digital camera that is a fourth embodiment of an electronic apparatus equipped with a rotation angle detection device of the present invention will be described with reference to FIG. 8A and FIG. 8B. It should be noted that the same reference numerals are attached to duplicated sections or corresponding sections with respect to the above-mentioned first embodiment and their descriptions are omitted.

Conventionally, an operation dial of a camera that is used for selecting a mode defines rotation stop positions in order to assign functions used to the rotation stop positions. Moreover, many operation dials have a click mechanism that gives a user a click feeling in order to present the stop positions clearly when a user rotationally operates a dial.

In the fourth embodiment, the rotation angle detection device 10C equipped with such rotation stop positions will be described. FIG. 8A is a perspective view showing the rotation angle detection device 10C, and FIG. 8B is an exploded perspective view thereof. Unlike the above-mentioned first embodiment, the rotation angle detection device 10C shown in FIG. 8A and FIG. 8B is provided with a click mechanism that regulates rotation stop positions.

Figure 8A:
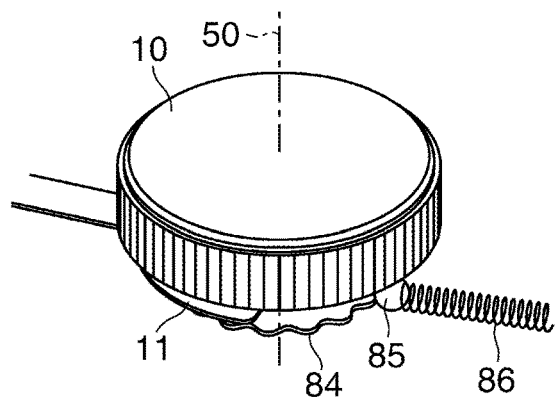
FIG. 8A and FIG. 8B are a perspective view and an exploded perspective view showing a rotation angle detection device in a digital camera that is an electronic apparatus equipped with the rotation angle detection device according to a fourth embodiment of the present invention.
Figure 8B:
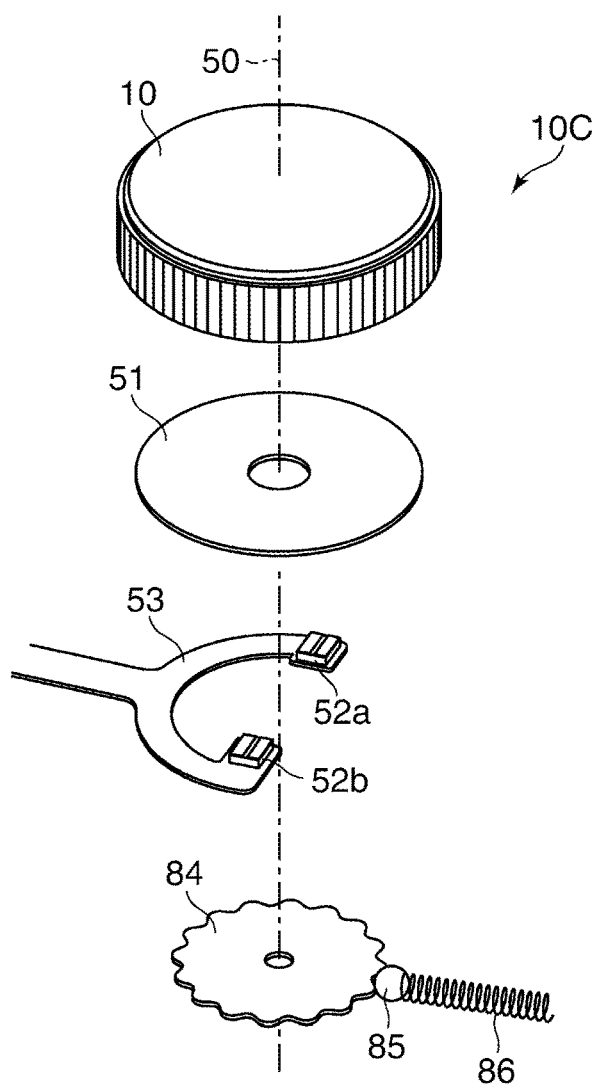

As shown in FIG. 8A and FIG. 8B, a stop position regulation member 84 is fixed to the rotation detection target 51 and rotates together with the operation dial 10. One end of a pressure spring 86 that gives pressure to a ball member 85 by the other end is fixed to the camera body 1 in the same manner as the rotation detection elements 52a and 52b. The ball member 85 is pressed by the pressure spring 86 toward the rotation axis 50, stops the operation dial 10 by fitting into one of grooves formed on the outer periphery of the stop position regulation member 84, and generates the click feeling.

The rotation of the operation dial 10 stops at the rotation angle (hereinafter referred to as a stop position) where the ball member 85 is fit into one of the grooves of the stop position regulation member 84. The operation dial 10 does not stably stop at the other rotation angle (hereinafter referred to as a non-stop position).

At the stop position at which the ball member 85 fits into the groove of the step position regulation member 84, the rotation detection target 51 faces the rotation detection elements 52a and 52b in the axial direction without backlash. In the meantime, since there is backlash between the rotation detection target 51 and the rotation detection elements 52a and 52b at the non-stop position other than the stop position, an error tends to occur when the rotation angle of the operation dial 10 is read at the non-stop position, which may misdetect the rotation angle. Accordingly, the rotation angle detection device 10C preferably detects the rotation angle at each of the stop positions. Specifically, there is a possible method that reads the rotation angle of the operation dial 10 when a detector provided in a groove of the stop position regulation member 84 detects contact with the ball member 85. Moreover, there is another possible method that does not read the rotation angle during the rotational operation of the operation dial 10 by setting a read timing to about one per second.

When the rotation stop positions of the operation dial 10 are regulated by using such a configuration so that the rotation detection elements 52a and 52b will detect a rotation angle at a position other than the detection edge, misreading of the rotation angle is avoidable. The other configurations and operation effects are the same as that of the above-mentioned first embodiment.

Next, a digital camera that is a fifth embodiment of an electronic apparatus equipped with a rotation angle detection device of the present invention will be described with reference to FIG. 9A and FIG. 9B. It should be noted that the same reference numerals are attached to duplicated sections or corresponding sections with respect to the above-mentioned first and fourth embodiments and their descriptions are omitted. In the fifth embodiment, preferable arrangements of the stop position regulation member 84 and the light irradiation regions 53a and 53b by the rotation detection elements 52a and 52b will be described.

Figure 9A:
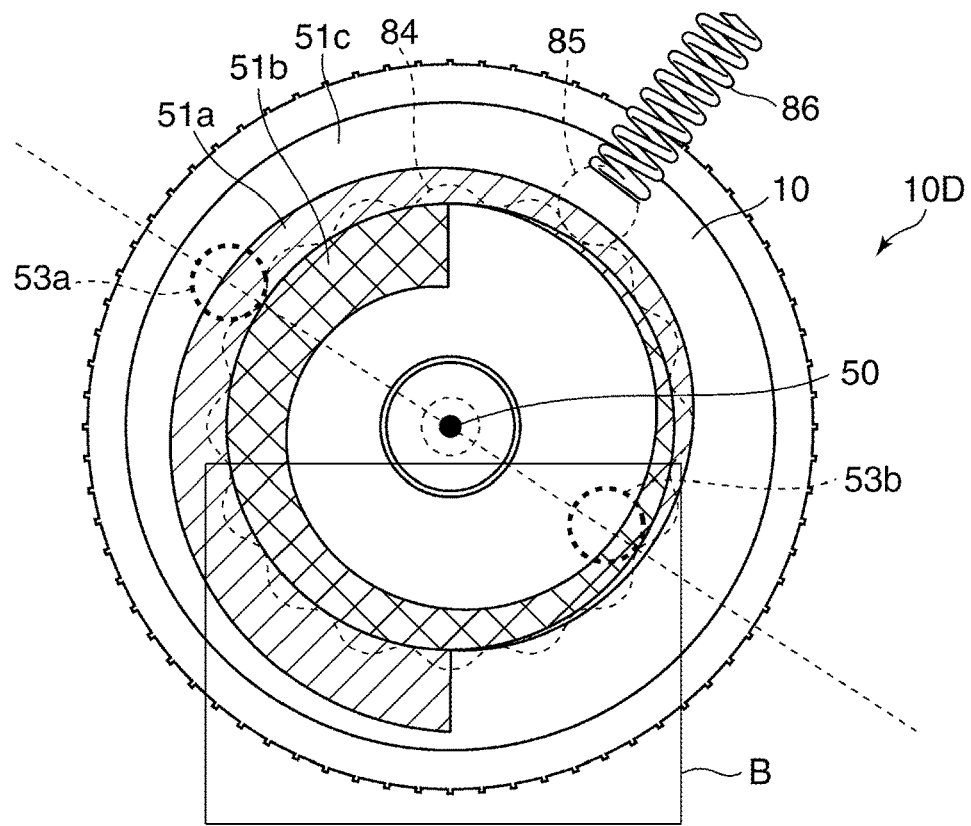
FIG. 9A is a view showing a rotation angle detection device that is viewed from a back side of an operation dial in a digital camera that is an electronic apparatus equipped with the rotation angle detection device according to a fifth embodiment of the present invention.

FIG. 9A is a view showing a rotation angle detection device 10D that is viewed from the back side of the operation dial 10. FIG. 9B is an enlarged view of a section B in FIG. 9A. Although the stop position regulation member 84 and the ball member 85 are actually arranged in front of the rotation detection target 51 in a sheet of the drawing, their contours are indicated by broken lines in FIG. 9A and FIG. 9B in order to make the rotation detection target 51 become easy to see. As shown in FIG. 9B, the outer light irradiation region 53a will be located at irradiation positions 89a and 89b before and after passing the detection edge.

Figure 9B:
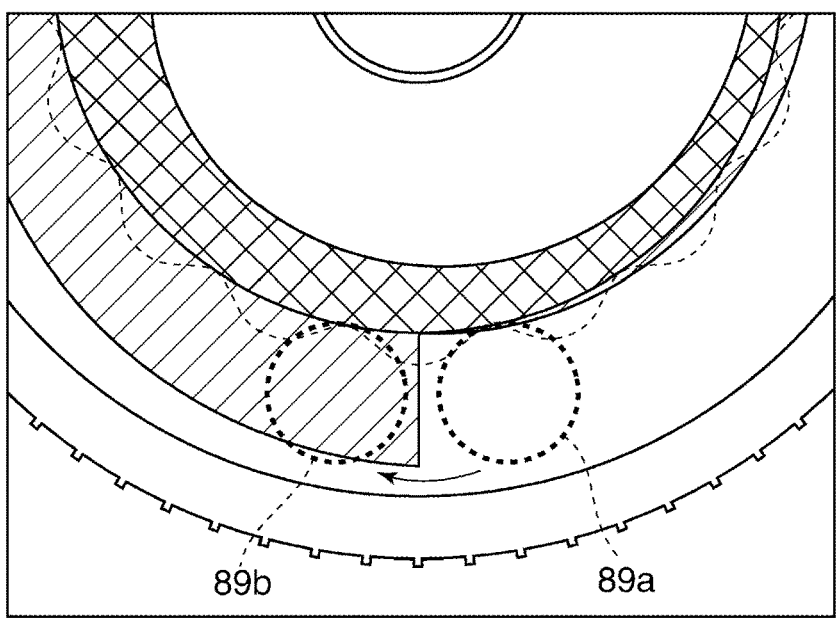
FIG. 9B is an enlarged view of a section B in FIG. 9A.

As shown in FIG. 9A and FIG. 9B, since the ball member 85 is energized with the pressure spring 86 to the groove of the stop position regulation member 84, the operation dial 10 stops at every rotation angular interval of the grooves provided in the stop position regulation member 84 when the operation dial 10 is rotated.

Accordingly, the rotation detection elements 52a and 52b stop relative to the rotation detection target 51 at every interval of the grooves provided in the stop position regulation member 84. That is, from the operation dial 10, the light irradiation regions 53a and 53b look moving relatively on the rotation detection target 51 by every interval of the grooves of the stop position regulation member 84.

A motion of the light irradiation region near the detection edge of the rotation detection target 51 will be described with reference to FIG. 9B. When a user rotates the operation dial 10 near the detection edge in the counterclockwise direction in the drawing, the light irradiation region 53a at the position 89a looks moving in the direction of an arrow in FIG. 9B relatively from the operation dial 10. The light irradiation region 53a that started moving moves by the angular interval of the grooves provided in the stop position regulation member 84 mentioned above and stops at the position 89b.

As mentioned above, since the detection edge of the detection scale is located at about a midpoint between the adjacent grooves of the stop position regulation member 84 (between the adjacent stop positions determined by the stop position regulation member 84), the rotation angle is not misdetected. This enables to provide the rotation angle detection device 10D that does not misdetect the rotation angle even if the operation dial 10 rotates infinitely. The other configurations and operation effects are the same as that of the above-mentioned first embodiment.

It should be noted that the present invention is not limited to what has been described with the above-mentioned embodiments, quality of the material, a shape, a size, a formation, the number of elements, arrangement locations, etc., can be changed suitably unless it is deviated from the scope of the present invention.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-180188, filed Sep. 20, 2017, which is hereby incorporated by reference herein in its entirety.

What is claimed is:

1. A rotation angle detection device comprising:
    a rotation member configured to allow a rotational operation;
    a rotation detection target including at least two detection scales formed around a rotation axis of the rotation member including an outer scale provided in a radially outer portion and an inner scale provided in a radially inner portion;
    two rotation detection elements arranged so as to respectively detect rotation positions of the outer scale and the inner scale relative to the two rotation detection elements and to output signals corresponding to the rotation positions, wherein either of the rotation detection target or the two rotation detection elements is configured to rotate together with the rotation member relative to the other, and the rotation positions change according to a rotation of the either of the rotation detection target or the two rotation detection elements relative to the other; and a control unit configured to calculate a rotation angle of the rotation detection target relative to the two rotation detection elements, using the signals output from the two rotation detection elements, wherein the outer scale and the inner scale are so formed that a signal output from one of the two rotation detection elements increases and the signal output from the other decreases when the rotation member is rotated, wherein the outer scale and the inner scale are formed so as to be separated mutually in the radial direction, and wherein the control unit calculates the rotation angle using a difference and total value of the signals output from the two rotation detection elements.

2. The rotation angle detection device according to claim 1, wherein the outer scale and the inner scale are so formed that rotation positions across which the signals output from the two rotation detection elements vary between an upper limit level and a lower limit level are opposite across the rotation axis.

3. The rotation angle detection device according to claim 1, wherein the rotation detection target has a non-detection range at a certain rotation angle in which the rotation angle is not detected with the two rotation detection elements, and wherein the rotation positions across which the signals output from the two rotation detection elements vary between the upper limit level and the lower limit level are in the non-detection range.

4. The rotation angle detection device according to claim 1, further comprising a click mechanism configured to regulate the rotation member at stop positions by generating click feeling, wherein the control unit calculates the rotation angle using the signals output from the two rotation detection elements when the rotation member stops at one of the stop positions.

5. The rotation angle detection device according to claim 4, wherein the rotation positions across which the signals output from the two rotation detection elements vary between the upper limit level and the lower limit level are not coincident with the stop positions.

6. An electronic apparatus equipped with a rotation angle detection device, the rotation angle detection device comprising:

a rotation member configured to allow a rotational operation;

a rotation detection target including at least two detection scales formed around a rotation axis of the rotation member including an outer scale provided in a radially outer portion and an inner scale provided in a radially inner portion;

two rotation detection elements arranged so as to respectively detect rotation positions of the outer scale and the inner scale relative to the two rotation detection elements and to output signals corresponding to the rotation positions, wherein either of the rotation detection target or the two rotation detection elements is configured to rotate together with the rotation member relative to the other, and the rotation positions change according to a rotation of the either of the rotation detection target or the two rotation detection elements relative to the other; and a control unit configured to calculate a rotation angle of the rotation detection target relative to the two rotation detection elements, using the signals output from the two rotation detection elements, wherein the outer scale and the inner scale are so formed that a signal output from one of the two rotation detection elements increases and the signal output from the other decreases when the rotation member is rotated, wherein the outer scale and the inner scale are formed so as to be separated mutually in the radial direction, and wherein the control unit calculates the rotation angle using a difference and total value of the signals output from the two rotation detection elements.

7. The rotation angle detection device according to claim 1, wherein the two rotation detection elements are arranged at opposite positions across the rotation axis in the radial direction of the rotation detection target.

8. The rotation angle detection device according to claim 1, wherein the two rotation detection elements are arranged to have a same angular position in the circumferential direction of the rotation detection target around the rotation axis.

* * * * *